US006020387A

United States Patent [19]

Downey et al.

[11] Patent Number: 6,020,387

[45] **Date of Patent: *Feb. 1, 2000**

[54] LOW DENSITY POLYMERS AND METHODS OF MAKING AND USING SAME

[75] Inventors: William J. Downey, Somerset; Christopher Andreola, Morristown, both of N.J.; Paul R. Lydigsen, Westmont, Ill.; Wayne E. Wright, South Plainfield, N.J.

[73] Assignee: Caschem, Inc., Bayonne, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/934,744

[22] Filed: Sep. 22, 1997

[51] Int. Cl.[7] .............................. C08G 18/06

[52] U.S. Cl. .............................. 521/57; 521/122; 521/123; 521/130; 521/134; 521/135; 521/137; 521/138; 524/492; 524/779; 524/789; 523/218; 523/219; 525/100; 525/107; 525/123; 525/165

[58] Field of Search .............................. 521/57, 122, 123, 521/130, 135, 137, 138, 134; 524/492, 779, 789; 523/218, 219; 525/123, 107, 165, 100

[56] References Cited

U.S. PATENT DOCUMENTS

| | | | |
|---|---|---|---|
| 4,100,114 | 7/1978 | Nalea et al. | 521/175 |
| 4,157,907 | 6/1979 | Kroyer | 65/33 |
| 4,171,228 | 10/1979 | Lowrey | 106/300 |
| 4,219,781 | 8/1980 | Moore et al. | 336/58 |
| 4,252,658 | 2/1981 | Tasaka et al. | 252/29 |
| 4,275,172 | 6/1981 | Barth et al. | 521/112 |
| 4,485,192 | 11/1984 | Gobbs et al. | 521/54 |
| 4,525,386 | 6/1985 | Weisman | 427/185 |
| 4,592,961 | 6/1986 | Ehrreich | 428/480 |
| 4,927,861 | 5/1990 | Souto et al. | 521/99 |
| 5,071,683 | 12/1991 | Verwilst et al. | 427/420 |
| 5,342,689 | 8/1994 | Mebber et al. | 521/57 |
| 5,344,673 | 9/1994 | Hotta et al. | 427/195 |
| 5,371,117 | 12/1994 | Parish et al. | 523/219 |
| 5,378,733 | 1/1995 | Bates et al. | 521/65 |
| 5,433,872 | 7/1995 | Brauer et al. | 252/28 |
| 5,473,043 | 12/1995 | Maki et al. | 528/60 |
| 5,476,343 | 12/1995 | Sumner | 405/157 |
| 5,512,655 | 4/1996 | Klauck et al. | 528/74.5 |
| 5,534,348 | 7/1996 | Muller et al. | 428/402 |
| 5,665,785 | 9/1997 | McClellan et al. | 521/51 |
| 5,688,860 | 11/1997 | Croft | 524/710 |

*Primary Examiner*—Rachel Gorr
*Attorney, Agent, or Firm*—Pennie & Edmonds LLP

[57] ABSTRACT

A low density polymer composition including a polymer component capable of being cured, a low density filler in an amount sufficient to reduce the density of the polymer and a thixotrope present in a sufficient amount to impart a sufficient viscosity and to inhibit separation of the filler from the polymer until after the polymer is cured. The resulting lightweight, filled polymer composition is a strong electrical insulator, has low shrinkage, a low coefficient of thermal expansion, low cured density and a soft filler that does not harden the polymer. Methods of preparing and using the low density polymer compositions are also disclosed.

21 Claims, No Drawings

LOW DENSITY POLYMERS AND METHODS OF MAKING AND USING SAME

TECHNICAL FIELD

This invention relates to a low density polymer composition, typically made from first and second polymer components, a low density filler, and a thixotrope.

BACKGROUND OF THE INVENTION

Polymers, such as polyurethanes, are well known in the art, as are various methods of making such polymers. In particular, it is known to modify polymers through use of additives to produce a desired property in the polymer for use in varying applications. Some examples of these polymers are as follows.

U.S. Pat. No. 5,512,655 discloses a process for the production of polyurethanes from dihydroxyfatty acids and/or dihydroxypolyfatty acids by reacting an isocyanate, a polyol, and a dihydroxyfatty acid formed by ring opening an epoxidized fatty acid, as well as a polyurethane product usable in thixotropic pastes.

U.S. Pat. No. 5,476,343 discloses an improved, thermally insulated, impact and abrasion resistant pipeline and low conductivity, flexible cementitious material using a polymeric modifier. The pipeline includes 25 to 40 percent fly ash cenospheres, glass microspheres or a combination of the two. The reference further discloses conventional pipelines having flexible coatings of solid, elastomers or elastomers filled and extended with other low density materials, such as polyurethane elastomers filled with glass micro-spheres.

U.S. Pat. No. 5,473,043 discloses moisture-curable urethane resins having urethane prepolymers, a blocked amine compound, and an inorganic filler treated with an organic compound, such as a variety of calcium carbonates treated with a fatty acid, a fatty acid ester, a titanium compound, a silane, and a surface active agent. The urethane resin may contain a variety of additives, one of which is a thixotropic agent at least. The filler is at least 5 parts by weight, and preferably at least 10 parts by weight, to avoid having the filler settle during storage and forming a hard cake at the bottom of the storage container. The reference also notes that anti-settling agents may be used to prevent the filler from settling, but that this often results in retarding curing or affecting storage stability.

U.S. Pat. No. 5,433,872 discloses a grease composition having 75 to 95 parts by weight of a base component of a liquid or semi-solid polyol based polyurethane having about 1 to 15 parts by weight of a thickening agent such as colloidal silica particles, and an antioxidant.

U.S. Pat. No. 5,344,673 discloses spherical resin particles and methods of making same, by preparing a micro-dispersion of a condensation polymer and permitting the micro-dispersed particles to coalesce by maintaining ions on the surface of the particles, where urethane resins are the preferred particle material.

U.S. Pat. No. 5,071,683 discloses a method and device for forming a gellified polyurethane layer on a surface by spraying a mixture of polyol and isocyanates having a viscosity between 20 and 2,000 centipoise, thereby avoiding the micro air-bubbles that form using a conventional technique.

U.S. Pat. No. 4,592,961 discloses a liquid coating formulation having a homogeneous solution of solvent, an aromatic polyester resin and vinylidene chloride copolymer, and a quantity of particles having an average diameter of less than about 15 microns. Sufficient homogeneity is desired, and this feature is best tested by avoiding formation of micro-bubbles.

U.S. Pat. No. 4,927,861 discloses a rigid polyurethane foam having a low density ranging from 0.20 to 1.30 g/cm$^3$, which is prepared by reacting at least one polyether polyol and at least one polyester polyol, a hydroxyl, and an aromatic polyisocyanate, such as diphenylmethane diisocyanate (MDI), and the combinations that can be injection molded to form various parts of conventional articles.

U.S. Pat. No. 4,525,386 discloses a technique for enhancing open-celled polyurethane foam by impregnating the foam with filler particles having the desired properties, wherein the filler particles may be micron sized micro-spheres of glass, metal powders, or other additives, depending on the property to be enhanced.

U.S. Pat. No. 4,252,658 discloses a solid lubricant having carbon micro-spheres of 0.1 to 1,000$\mu$ and a specific gravity of 0.2 to 2.0, and wherein the carbonizable material may be a thermosetting resin, a crosslinkable high molecular weight compound, or an organic high molecular weight compound, such as a polyurethane like polyethylene methylenebis(4-phenyl) carbamate.

U.S. Pat. No. 4,157,907 discloses a method of forming a moldable material in the form of coated glass particles by producing the glass in a kiln, crystallizing and grinding the glass to a smaller size, and adding a thermosetting organic resin binder, which may be a thermosetting binder or a curable plastic such as polyurethane resins. This produces molding compositions having a high content of crystallizable glass particles without impairing their moldable properties and mechanical characteristics.

It is desired, however, to make and use low density polymers, in particular low density polyurethanes, by including a filler in the polymer composition. It would also be desirable to produce a low density polymer that is stable over long time periods.

SUMMARY OF THE INVENTION

The present invention relates to a reactable composition for use in preparing a low density polymer composition which includes a first polymer component, a low density filler in an amount sufficient to reduce the density of the polymer composition and a thixotrope present in an amount sufficient to inhibit separation of the filler from the polymer component until the polymer composition is prepared. In another embodiment of the reactable composition the first polymer component is capable of reaction with a second polymer component to prepare a polyurethane, an epoxy, silicone, or a polyester polymer composition.

In one embodiment, the filler is present in an amount of about 0.5 to 60 weight percent, and comprises microspheres having a true density of about 0.001 g/cm$^3$ to 1 g/cm$^3$. In a preferred embodiment, the filler is present in an amount of about 1 to 5 weight percent, and the microspheres have a density of about 0.005 g/cm$^3$ to 0.2 g/cm$^3$. In one embodiment, the microspheres are made of plastic, glass, ceramic, or metal. In a preferred embodiment, the ceramic includes silica or the plastic includes an acrylonitrile-methacrylonitrile co-polymer.

In one embodiment, the thixotrope imparts a viscosity sufficient to inhibit separation of the filler from the first polymer component prior to reaction with the second polymer component and is present in an amount of about 0.1 to 5 weight percent. In a preferred embodiment, the thixotrope, filler and first polymer component have a viscosity from about 15 kcPs to 40 kcPs, and the thixotrope includes a castor oil, a ricinoleate, a ricinic acid ester, a ricinoleic acid, a ricinoleic acid amide, a ricinoleic acid ester, a sulfonated ricinoleate, a ricinic ester, a ricinic alcohol, a ricinoleyl acid, a ricinoleyl acid amide, a ricinoleyl alcohol, a ricinoleyl alcohol ester, an alkali ricinoleate, a mixture of an alkali ricinoleate, a ricinolamide, a hydrogenated castor oil, a fumed silica, a thixotropic clay, or a polyethylene component.

In one embodiment, a low density polymer composition is formed from a polymeric reaction product of first and second polymer components, a low density filler distributed throughout the polymer composition and being present in an amount sufficient to reduce the density of the polymer composition, and a thixotrope present in an amount sufficient to inhibit separation of the filler from the first polymer component until the reaction product is prepared.

In one embodiment of the low density polymer composition the first polymer component is capable of reaction with a second polymer component to prepare a polyurethane, an epoxy, silicone, or a polyester polymer, and the filler includes microspheres having a true density of about 0.001 g/cm$^3$ to 1 g/cm$^3$ which are present in an amount of about 0.5 to 50 weight percent. In a preferred embodiment, the microspheres are made of plastic, glass, ceramic, or metal and the thixotrope imparts a viscosity sufficient to inhibit separation of the filler from the first polymer component prior to reaction with the second polymer component, and is present in an amount of about 0.1 to 5 weight percent. In one embodiment of the low density polymer composition, the first polymer component is a polyol, and the second component is an isocyanate. In a preferred embodiment, the isocyanate component is a polymeric methylene diphenyl diisocyanate ("PMDI"), toluene diisocyanate, an aliphatic diisocyanate, or a methylene dicyclohexyl diisocyanate ("HMDI"), and the polyurethane has an equivalent ratio of isocyanate to polyol of between about 0.5 and 1.5. In a more preferred embodiment the polyol is an alkylpolyol or an alkylester polyol. In one embodiment of the low density polymer composition at least one additive present in about 0.001 to 50 weight percent is included. In a preferred embodiment, the additive is a plasticizer, a diluent, a fire retardant compound, a biocide, a fungicide, an antioxidant, or a catalyst. In one preferred embodiment, the catalyst is an organometallic compound or a tertiary amine.

In one embodiment the low density polymer composition is prepared by providing first and second polymer components capable of reacting together to form a polymeric reaction product, adding a low density filler to the first polymer component, where the filler is added in an amount sufficient to reduce the density of the polymer composition, adding a thixotrope to the first polymer component in an amount sufficient to inhibit separation of the filler from the first polymer component until reaction with the second polymer component, and reacting the first and second components together to form the low density polymer composition. In another embodiment, the first and second polymer components are selected to be capable of reaction to prepare a polyurethane, an epoxy, silicone, or a polyester polymer.

In one embodiment of preparing the low density polymer, the first polymer component is selected to be a polyol, the second polymer component is selected to be an isocyanate component, and the filler is selected to be microspheres having a true density from about 0.001 g/cm$^3$ to 1.0 g/cm$^3$. In another embodiment, the microspheres are formed of a plastic, ceramic or metal, and a pre-polymer is formed prior to preparing the polymer composition. In another embodiment of preparing the low density polymer, the thixotrope is selected to impart a viscosity sufficient to inhibit separation of the filler from the polyol component prior to cure of the polyurethane composition.

DETAILED DESCRIPTION OF THE INVENTION

It has been discovered that low density polymer compositions containing polymers such as polyurethanes, epoxies or polyesters can be provided with significantly longer storage and usage lives than those of the prior art. The low density polymer composition of the present invention is preferably in a liquid or gel state. Any suitable polymer components may be used to prepare the low density polymer composition, although the components are selected to preferably form a polyurethane, polyester, silicone, or epoxy.

The most preferred polymer is a polyurethane. Polyurethanes are typically made by reacting an isocyanate with a polyol. This reaction can occur through the use of a one-part or a two-part polyurethane composition, and if desired, by forming prepolymers before reacting the components to form the polyurethane.

The low density polymer composition is made by reacting the first and second polymer components together with a low density filler component, and a thixotrope. When the polymer is a polyurethane, it is typically formed by reacting an isocyanate component and a polyol component. Depending on the intended use of the low density polymer compositions, a variety of polyols, isocyanates, or other prepolymers may be used to enhance the desired properties, and one or more of various additives can be included to soften the polymer, vary its density, or enhance fire retardancy, for example.

For example, a variety of isocyanate components are available for reacting with polyols to form polyurethanes, and any type of polymeric methylene diphenyl diisocyanate or its derivatives, such as toluene diisocyanate, aliphatic isocyanate, methylene dicyclohexyl diisocyanate, or hexamethylene diisocyanate, may be used. When a two-part formulation is used to form the polyurethane, the isocyanate component is reacted with a polyol component. The polyols generally range in specific gravity from about 0.9 to 1.2. Any suitable polyol component may be used, including castor oil or its hydroxy bearing derivatives, alkyl glycol, alkoxyglycol, etherglycol, alkylpolyol, alkylester polyol, polypropyleneoxy glycols (PPG), polypropylene glycol, polybutyl glycol, polybutadiene polyols, polyester polyols, and polytetramethylene ether glycols (PTMEG). The specific polyol and isocyanate components, or prepolymer components, are selected to produce specific performance in the polyurethane component. The molecular weight equivalent ratio of isocyanate component to polyol component is typically between about 0.5 to 1.5, and preferably about 0.6 to 1.4. The most preferred equivalent ratio of these components for use in the present invention is between about 0.9 to 1.2.

In order to produce a polymer composition that is light weight and has the desired low density, a low density filler component is added to the polymer. Any one of a number of materials, taken alone or in combination, may be used, such as silica or other ceramics, carbon black, metals or plastics such as an acrylonitrile, polyacrylonitrile, or acrylonitrile-methacrylonitrile co-polymer. These materials may be used in a variety of low density forms such as cenospheres, zeospheres, microbubbles, hollow spheres, or combinations thereof. The filler typically has a true density less than about 1 g/cm$^3$, preferably between about 0.01 to 0.8 g/cm$^3$. Some examples of suitable fillers are as follows: Q-CEL® spheres, having a true density up to about 0.8 g/cm$^3$, commercially available from PQ Corp. of Valley Forge, Pa.; Z-LIGHT® W1000 zeospheres (silica/alumina/ceramic alloy), having a true density of about 0.7 g/cm$^3$, commercially available from Zeelan Industries of St. Paul, Minn.; SCOTCH-LIGHT® S38 spheres, having a true density of about 0.38 g/cm$^3$, commercially available from 3M Corporation of St. Paul, Minn.; DUALITE M6001AE spheres, having a true density of about 0.13 g/cm$^3$, commercially available from Pierce & Stevens Corporation of Buffalo, N.Y.; and EXPANCEL 551DE, having a true density of about 0.042 g/cm$^3$, commercially available from Expancel Inc. of Duluth, Ga. Although any low density filler described herein is suitable, the filler is preferably plastic or glass microspheres, and more preferably plastic microspheres. For example, the filler may be plastic microspheres that include a variety of mixtures of polyacrylonitrile-containing polymers. Preferably, these plastic microspheres have a true density between about 0.001 g/cm$^3$ to 0.2 g/cm$^3$. In a most preferred embodiment, the filler is plastic microspheres of an acrylonitrile-methacrylonitrile copolymer filled with isopentane gas. These are sold under the tradename PM 6550, commercially available from PQ Corporation of Valley Forge, Pa. The PM 6550 microspheres have a true density of between about 0.02 g/cm$^3$ to 0.03 g/cm$^3$.

The low density filler component is incorporated in the polymer composition in an amount or weight percentage that is sufficient to reduce the density of the polymer composition. The low density filler component is present between about 0.5 to 60 percent when used with polymers having a density of about 1 g/cm$^3$ or greater. Preferably, the filler component has a true density between about 0.001 g/cm$^3$ to 1 g/cm$^3$, is present in an amount of about 1 to 50 weight percent, preferably about 1.5 to 30 weight percent and more preferably about 2 to 10 weight percent. More preferably, the filler component has a true density between about 0.001 g/cm$^3$ to 0.1 g/cm$^3$, and is present in an amount of about 0.5 to 5.0 weight percent, preferably between about 1 to 3 weight percent, and more preferably between about 2 to 2.5 weight percent of the polymer composition.

This low density filler component would tend to rise and to separate from the polymeric component relatively quickly unless special precautions are taken. According to the invention, a thixotrope must be added to the polymeric component to increase the viscosity of the polymer component and inhibit the separation tendency of the low density filler component. The thixotrope advantageously permits the use of very low density filler components, yielding a lower density polymer product, by inhibiting separation of the filler from the polymer until the composition cures. The thixotrope sets-up the polymer composition and filler to a high viscosity, which keeps the filler interspersed throughout the polymer for weeks, months, or even longer depending on the exact formulation. In the event that some separation occurs, the filler component is easily redispersed because it does not "hard-pack" on the top or bottom of the containers that hold the composition. Redispersion of the filler component can be accomplished through shearing, although other mixing methods are also suitable. Upon shearing, the viscosity of the polymer and thixotrope is reduced so the polymer composition is more easily processable, such as for pouring. Other methods of breaking down the viscosity for processing can be used, including pumping or agitating the polymer composition.

The viscosity of the thixotrope, filler, and first polymer component is typically at least 10 kcPs (kilocentipoise), preferably between about 15–40 kcPs, and more preferably between about 20–25 kcPs. This is measured by CasChem procedure CC-413B which is a cone and plate viscometer method using the Brookfield cone and plate viscometer, model RVTDCP, spindle CP-52, and is based on the Brookfield digital viscometer model DV-II. The thixotrope is typically a divided solid, although liquid or gel-like thixotropes are suitable if they sufficiently inhibit separation of the filler. Suitable thixotropes include castor oil or its derivatives, such as ricinoleates, ricinic acid esters, ricinoleic acids, ricinoleic acid amides, ricinoleic acid esters, sulfonated ricinoleates, ricinic esters, ricinic alcohols, ricinoleyl acids, ricinoleyl acid amides, ricinoleyl alcohols, ricinoleyl alcohol esters, alkali ricinoleates, mixtures of an alkali ricinoleate, ricinolamides, hydrogenated castor oil, fumed silicas, thixotropic clays, and polyethylene-based compositions. The thixotrope typically needs to be added to the polyol prior to addition of the filler. For example, when the thixotrope is CASTORWAX®, the thixotrope should be added to the first polymer component to inhibit separation of the filler particles. When a mixture of clay and CASTORWAX® is used, the CASTORWAX® is preferably first added to the polyol and the filler is added in two charges with the clay being added between the two charges to ensure maximum shearing.

The thixotrope is added in an amount sufficient to inhibit the filler from separating out of the polymer prior to curing the composition. Preferably, the thixotrope is added to the polyurethane component in an amount of about 0.1 to 5 weight percent, more preferably about 0.5 to 3 weight percent, and most preferably about 0.8 to 2 weight percent. Preferred thixotropes include hydrogenated castor oils, thixotropic clays, or mixtures thereof. A variety of hydrogenated castor oils are commercially available from CasChem, Inc. of Bayonne, N.J. and various other manufacturers under the following tradenames: BORCHIGEL THIXO A, CASTORWAX A®, CASTORWAX MP 70®, CASTORWAX MP 80®, CENWAX G, CUTINA HR, DIAMOND® WAX A, DISPARLON 305, DISPARLON 4300, DISPARLON 805, IRGAROL TV 142, MPA 1075, OPALWAX, PROTEGIN W, PROTEGIN WX, RADIA 3200, RILANIT SPECIAL, SYNTHAWAX, T 20SF, THIXCIN, THIXCIN E, THIXCIN R, and THIXOMEN. Suitable thixotropic clays are generally powdered, and may be pre-dispersed in castor oil or another suitable polyol prior to addition as a thixotrope. When an amount of thixotropic clay is dispersed in castor oil to form part of the thixotrope, the castor oil or other polyol of the polymer composition is reduced by an equivalent amount. A preferred thixotropic clay is BENTONE® clay. In a more preferred embodiment, the thixotrope is CASTORWAX® or a mixture of CASTORWAX® and BENTONE® clay. It is presently most preferred to use a mixture of about 0.5 weight percent CASTORWAX® with about 6 weight percent clay-gel of BENTONE® clay dispersed in a castor oil gel, where about 5 to 15 weight percent, preferably about 10 weight percent, of the clay-gel is BENTONE® clay as a thixotrope. In this most preferred embodiment, the clay is present in about 0.6 weight percent of the composition. Including the about 0.5 weight percent CASTORWAX®, the clay and CASTORWAX® form the thixotrope of the composition present in about 1.1 weight percent. Accordingly, in the most preferred embodiment, the amount of castor oil or other polyol used in the first polyol component is reduced by about 5.2 weight percent to compensate for the equivalent amount used in the clay-gel mixture.

A variety of additional performance enhancing components may be added to produce desired performance and characteristics in the polyurethane component, including plasticizers (softening agent), diluents, fire retardants, antioxidants, biocides, fungicides and catalysts. These components may be present in up to about 50 weight percent of the total composition, more preferably up to about 1 weight percent and most preferably up to about 0.5 weight percent. Preferred antioxidant components include hindered amines, alkylacyls, diphenyl amines, and VANOX 1001, commercially available from Vanderbilt of Norwalk, Conn. Preferred biocide components include cinnamates having hydroxyl functionality, which are commercially available from Ciba-Geigy of Hawthorne, N.Y. The preferred fungicide components include METASOL TK-100 (thiabendazole), commercially available from Calgon of Pittsburgh, Pa., and NUOCIDE 960 (chlorothalonil), commercially available from Huls America of Piscataway, N.J. Each of the fungicide, biocide, and antioxidant components, when used, are preferably added in amounts up to about 3 weight percent, more preferably, up to about 1 weight percent. When a catalyst is preferably used, an organometallic compound is preferable. It is more preferable to use an organometallic compound that is an organobismuth, organomercury, or organotin. Most preferably, COTIN 200 dibutyltin dilaurate is chosen when a catalyst is used. This catalyst is available under the tradename COTIN 200, which is commercially available from CasChem, Inc of Bayonne, N.J. The catalyst, when present, is typically used in up to about 1 weight percent of the total composition, most preferably up to about 0.5 weight percent.

The low density filled polymers typically have strong electrical insulation properties, low shrinkage, low coefficient of thermal expansion, low cured density of about 0.60–0.70 g/cm$^3$ and a soft filler that does not harden the polymer composition or separate even after long periods. The low density polymer component of the present invention has many uses. For example, the low density polymer component can be used in electrical devices, motor vehicles, and construction projects. Some typical applications include telecommunications blocks, electrical pottings, automotive brakes, regulators, ignitions, terminal blocks, and the protection of open and exposed electrical or electronic circuits.

EXAMPLES

The invention is further defined by reference to the following example describing in detail the preparation of the compounds and compositions of the present invention. It will be apparent to those skilled in the art that many modifications, both to materials and methods, may be practiced without departing from the purpose and interest of this invention.

EXAMPLE 1

Preferred Embodiment of a Polymer Composition

A two-part light-weight polyurethane composition was prepared. To form the polyurethane, part A and part B were mixed and the resulting mixture was allowed to cure. The composition of the two parts is shown in the following table.

| PART | MATERIAL | WEIGHT % | COMPONENT & FUNCTION |
|---|---|---|---|
| A | PAPI 2094 | 28.0 | PMDI/reactant |
| B | Castor Oil | 69.2 | polyol/reactant |
| | CASTORWAX ® | 0.4 | thixotrope |
| | PM 6550 | 1.6 | plastic micro bubbles |
| | VANOX 1001 | 0.5 | antioxidant |
| | NUOCIDE 960 | 0.2 | fungicide |
| | COTIN 200 | 0.1 | catalyst |
| | TOTAL | 100.0 | |

The low density filler was used in the Part B mixture with the polyol and additives. The use of the PM 6550 reduced the specific gravity of Part B from 0.96 to 0.55. These bubbles had a low specific gravity of only 0.022, such that they would rise and separate from the polyol very quickly (a matter of hours). Rapid separation of the polyol component and the PM 6550 is undesirable.

To stabilize this separation, the hydrogenated castor oil CASTORWAX® was added. At the described amounts of filler and thixotrope, the polymer set up to a high viscosity, such that the filler remained interspersed throughout the polymer for a matter of weeks, rather than hours. The viscosity was found to be reduced upon shearing, however, so that the polyol component could be poured or the PM 6550 redispersed. Overall, the time to separation of the PM 6550 from the polyol component was lengthened from hours to weeks.

EXAMPLES 2–9

Polyol Formulations

Data were collected using various lightweight fillers in the polyol component of polyurethane. Formulations were prepared made with and without a thixotrope, which was CASTORWAX® in these examples.

| Ingredient | EXAMPLE 2 | 3 | 4 | 5 | 6 | 7 | 8 | 9 |
|---|---|---|---|---|---|---|---|---|
| Castor Oil (grams) | 100 | 100 | 100 | 100 | 100 | 100 | 100 | 100 |
| CASTORWAX ® (grams) | — | — | — | — | 0.25 | 0.25 | 1 | 1 |
| W1000 (grams) | 80 | — | — | — | — | — | — | — |
| S38 (grams) | — | 47.5 | — | — | 45 | — | 42.5 | — |

-continued

| Ingredient | EXAMPLE | | | | | | | |
|---|---|---|---|---|---|---|---|---|
| | 2 | 3 | 4 | 5 | 6 | 7 | 8 | 9 |
| M6001AE (grams) | — | — | 15 | — | — | 14.75 | — | 14 |
| 551DE (grams) | — | — | — | 4.5 | — | — | — | — |
| % Filler (w\w) | 44.4 | 32.2 | 13 | 4.3 | 31 | 12.8 | 29.6 | 12.2 |
| Separation (hours) | 24 | 36 | 36 | 24 | 168 | 168 | NONE | NONE |
| Blend Specific Gravity | 0.77 | 0.63 | 0.54 | .52 | 0.63 | 0.56 | 0.64 | 0.57 |

In Example 2, a 44.4 percent by weight formulation of Z-LIGHT® W1000 produced a polyol component with a specific gravity of about 0.77. The W1000 has a specific gravity of about 0.7 and separated from the polyol component in 24 hours. Similarly in Example 5, 4.5 grams of EXPANCEL 551DE with a specific gravity of about 0.042 was added to 100 grams of castor oil producing a 4.3 weight percent polyol component with a specific gravity of about 0.52. The 551DE separated from the polyol component in about 24 hours.

A 36 hour separation was observed for both SCOTCHLIGHT® S38 in Example 3 and DUALITE M6001AE in Example 4. The S38 was added to 100 grams of castor oil at about 32.2 percent by weight and resulted in a polyol component specific gravity of about 0.63. The M6001AE was added to 100 grams of castor oil at about 13.0 percent by weight and resulted in a polyol component specific gravity of about 0.54.

Both S38 and M6001AE were selected for additional testing with CASTORWAX® as a thixotrope. In Examples 6 and 7 about 0.25 grams of CASTORWAX® was added while 1 gram of CASTORWAX® was added in Examples 8 and 9. The lightweight fillers were added in similar weight percents. Examples 6 and 7 increased the separation time to 168 hours for both S38 and M6001AE while producing a polyol component specific gravity of about 0.63 and 0.56 respectively. Examples 8 and 9 showed no separation of either S38 or M6001AE after 3 to 4 months elapsed while producing a polyol component specific gravity of about 0.64 and 0.57 respectively.

The polyol component of Examples 2 through 9 may be used in combination with any isocyanate, performance enhancing additive, or combination thereof to produce a polymer or polyurethane with the desired properties.

Although preferred embodiments of the invention have been described in the foregoing description, it will be understood that the invention is not limited to the specific embodiments disclosed herein, but is capable of numerous modifications by one of ordinary skill in the art. It will be understood that the materials used and the chemical details may be slightly different or modified without departing from the methods and compositions disclosed and taught by the present invention.

What is claimed is:

1. A low-density reactable composition for use in preparing a low density polymer composition, comprising:

a first reactable polymer component in a liquid or gel state;

a low density filler comprising a plurality of plastic microspheres distributed throughout the first polymer component in an amount sufficient to reduce the density of the polymer composition; and a thixotrope comprising hydrogenated castor oil and a thixotropic clay present in an amount sufficient to inhibit separation of the filler from the polymer component until the polymer composition is prepared.

2. The reactable composition of claim 1, wherein the first polymer component is capable of reaction with a second polymer component to prepare a polyurethane, an epoxy, silicone, or a polyester polymer composition.

3. The reactable composition of claim 1, wherein the filler is present in an amount of about 0.5 to less than 5 weight percent and has a density of about 0.001 g/cm$^3$ to 1 g/cm$^3$, thereby yielding a low density polymer composition having a density of about 0.6 to 0.7 g/cm$^3$.

4. The reactable composition of claim 1, wherein the filler, thixotrope, and first polymer component have a viscosity from no less than 15 kcPs to about 40 kcPs, and the filler comprises a plurality of microspheres having a density of about 0.001 g/cm$^3$ to less than 0.03 g/cm$^3$.

5. The reactable composition of claim 1, wherein the plastic comprises an acrylonitrile-methacrylonitrile copolymer.

6. The reactable composition of claim 1, wherein the thixotropic clay comprises bentonite clay.

7. A low-density polymer composition comprising:

a first reactable polymer component capable of reacting with a second reactable polymer component to prepare a resultant polyurethane, the first polymer component being present in a liquid or gel state;

a low density filler comprising plastic microspheres distributed throughout the first polymer component and being present in an amount sufficient to reduce the density of the resultant polyurethane, and a thixotrope comprising a a mixture of a hydrogenated castor oil and at least one thixotropic clay present in an amount sufficient to inhibit separation of the filler from the first polymer component at least until the resultant polyurethane is prepared.

8. The polymer composition of claim 7, wherein the filler has a density from about 0.001 g/cm$^3$ to 1 g/cm$^3$ and is present in an amount of about 0.5 to less than 5 weight percent with the resultant polyurethane composition having a density of about 0.6 to 0.7 g/cm$^3$.

9. The polymer composition of claim 8, wherein the thixotrope imparts a viscosity sufficient to inhibit separation of the filler from the first polymer component prior to reaction with the second polymer component, and is present in an amount of about 0.1 to 5 weight percent.

10. The polymer composition of claim 7, wherein the first polymer component is a polyol, and the second component is an isocyanate.

11. The polymer composition of claim 10, wherein the isocyanate component is a polymeric methylene diphenyl diisocyanate, toluene diisocyanate, an aliphatic diisocyanate, or a methylene dicyclohexyl diisocyanate, and the polyurethane has an equivalent ratio of isocyanate to polyol of between about 0.5 and 1.5.

12. The polymer composition of claim 11, wherein the polyol is an alkylpolyol or an alkylester polyol.

13. The polymer composition of claim 7, further comprising at least one additive present in about 0.001 to 50 weight percent.

14. The polymer composition of claim 13, wherein the additive is a plasticizer, a diluent, a fire retardant compound, a biocide, a fungicide, an antioxidant, or a catalyst.

15. The polymer composition of claim 14, wherein the catalyst is an organometallic compound or a tertiary amine.

16. A method of preparing a low density polymer composition comprising:

providing first and second polymer components capable of reacting together to form a low density polymer composition, the first polymer component being present in a liquid or gel state;

adding a low density filler comprising a plurality of plastic microspheres to the first polymer component in an amount sufficient to reduce the density of the polymeric composition;

adding a thixotrope comprising a mixture of a hydrogenated castor oil and at least one thixotropic clay to the first polymer component in an amount sufficient to inhibit separation of the filler from the first polymer component at least until the first polymer component is reacted with the second polymer component; and reacting the first and second components together to form the low density polymer composition.

17. The method of claim 16, which further comprises selecting the first and second polymer components to be capable of reaction to prepare a polyurethane, an epoxy, silicone, or a polyester polymer.

18. The method of claim 17, which further comprises selecting the first polymer component to be a polyol, selecting the second polymer component to be an isocyanate component, and selecting the filler to be microspheres having a density from about 0.001 g/cm$^3$ to 1.0 g/cm$^3$.

19. The method of claim 18, which further comprises forming a prepolymer prior to preparing the polymer composition.

20. The method of claim 18, which further comprises selecting the thixotrope to impart a viscosity sufficient to inhibit separation of the filler from the polyol component prior to cure of the polyurethane composition.

21. The low density polymer composition produced by the method of claim 16.

* * * * *